(12) United States Patent
Panosian et al.

(10) Patent No.: US 11,460,283 B1
(45) Date of Patent: Oct. 4, 2022

(54) COMPACT TAPE MEASURE RETRACTION MECHANISM

(71) Applicants: Michael H. Panosian, Irvine, CA (US); Joshua M. Keeler, Irvine, CA (US)

(72) Inventors: Michael H. Panosian, Irvine, CA (US); Joshua M. Keeler, Irvine, CA (US)

(*) Notice: Subject to any disclaimer, the term of this patent is extended or adjusted under 35 U.S.C. 154(b) by 0 days.

(21) Appl. No.: 17/471,078

(22) Filed: Sep. 9, 2021

(51) Int. Cl.
*G01B 3/1005* (2020.01)

(52) U.S. Cl.
CPC ...... *G01B 3/1005* (2013.01); *G01B 2003/103* (2013.01)

(58) Field of Classification Search
CPC .................. G01B 3/1005; G01B 2003/103
See application file for complete search history.

(56) References Cited

U.S. PATENT DOCUMENTS

| | | | | |
|---|---|---|---|---|
| 4,068,383 A * | 1/1978 | Krebs | ........... | G01B 3/1005 33/767 |
| 4,232,837 A * | 11/1980 | Cutler | ........... | B65H 75/486 242/372 |
| 4,527,334 A * | 7/1985 | Jones | ........... | G01B 3/1005 33/761 |
| 6,276,071 B1 * | 8/2001 | Khachatoorian | .... | G01B 3/1005 242/381.3 |
| 6,962,002 B2 * | 11/2005 | Panosian | ........... | G01B 3/1084 33/760 |
| 9,207,058 B2 * | 12/2015 | Delneo | ........... | G01B 3/1005 |
| 9,874,428 B1 * | 1/2018 | Nelson | ........... | H05K 999/99 |
| 2019/0170491 A1 * | 6/2019 | Khangar | ........... | G01B 3/1005 |
| 2020/0033108 A1 * | 1/2020 | Vitas | ........... | G01B 3/1005 |

* cited by examiner

*Primary Examiner* — Nimeshkumar D Patel
*Assistant Examiner* — Tania Courson
(74) *Attorney, Agent, or Firm* — Farjam Majd; Arjomand Law Group, PLLC

(57) ABSTRACT

A device is disclosed including a compact tape measure housing enclosing a tape spool with a multi-segment spring-loaded tape retention mechanism having a tape spool, a primary rewind spring, a secondary rewind spring coupled together via a rotating spring coupling. In various embodiments, the primary and the secondary springs may be placed side-by-side making the two springs and the overall tape measure device smaller in diameter. The primary and the secondary rewind springs are coupled to the tape spool and the housing via an axle pin. The diameter of the tape measure housing may be reduced if two or more rewind springs are used instead of a single one. The primary and the secondary rewind springs operate in series. On pulling the measuring tape, the primary spring is compressed, causing the secondary rewind spring to compress. On release of the tape, the springs operate in reverse, retracting the tape.

20 Claims, 6 Drawing Sheets

SECTION B-B

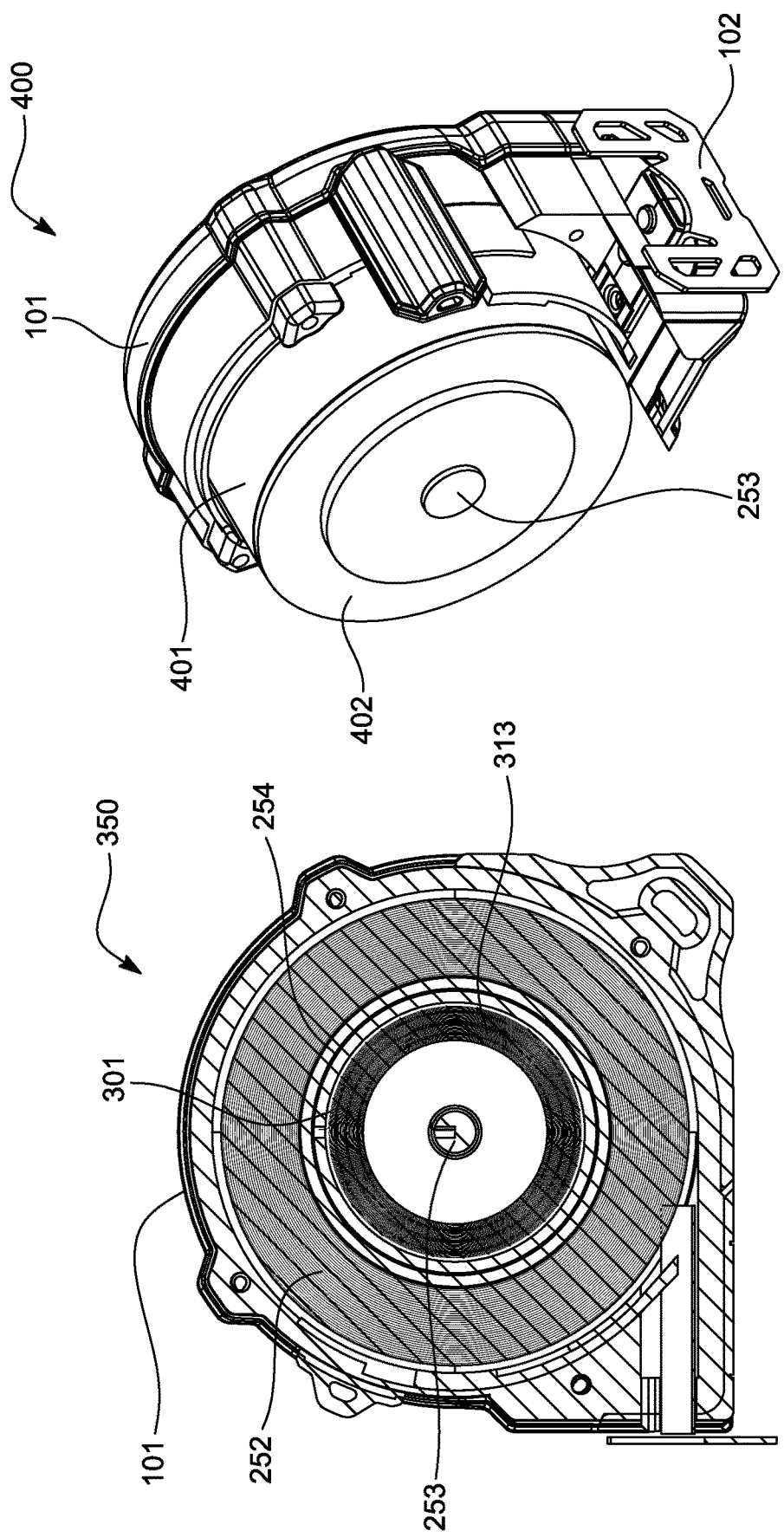

SECTION A-A

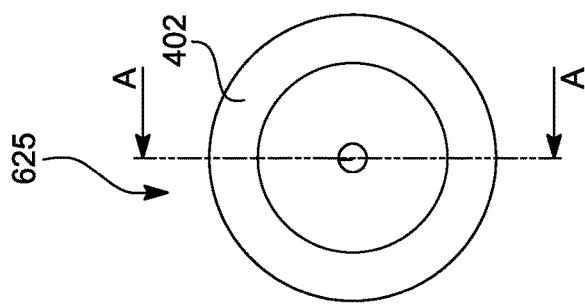
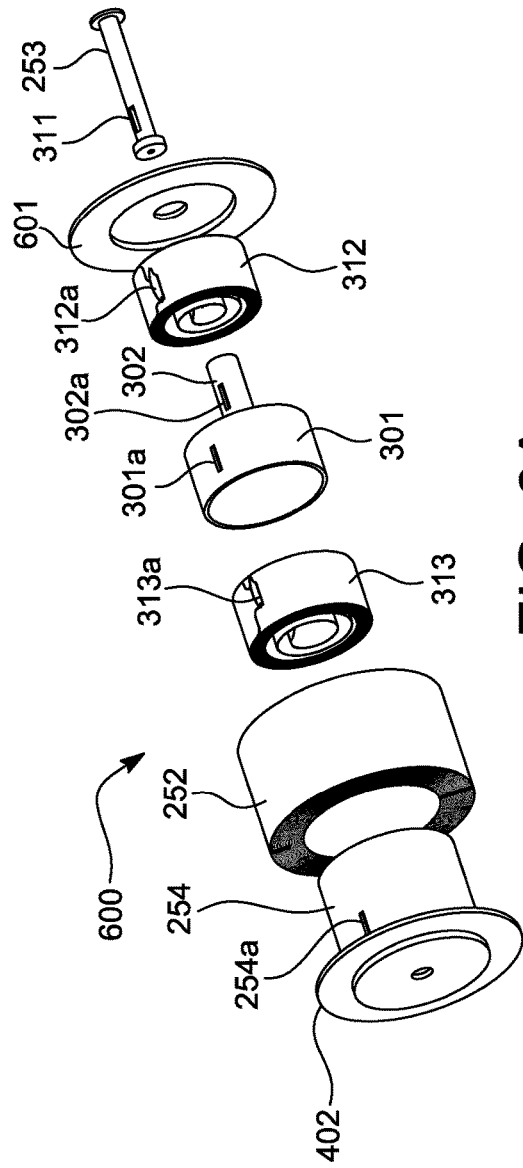
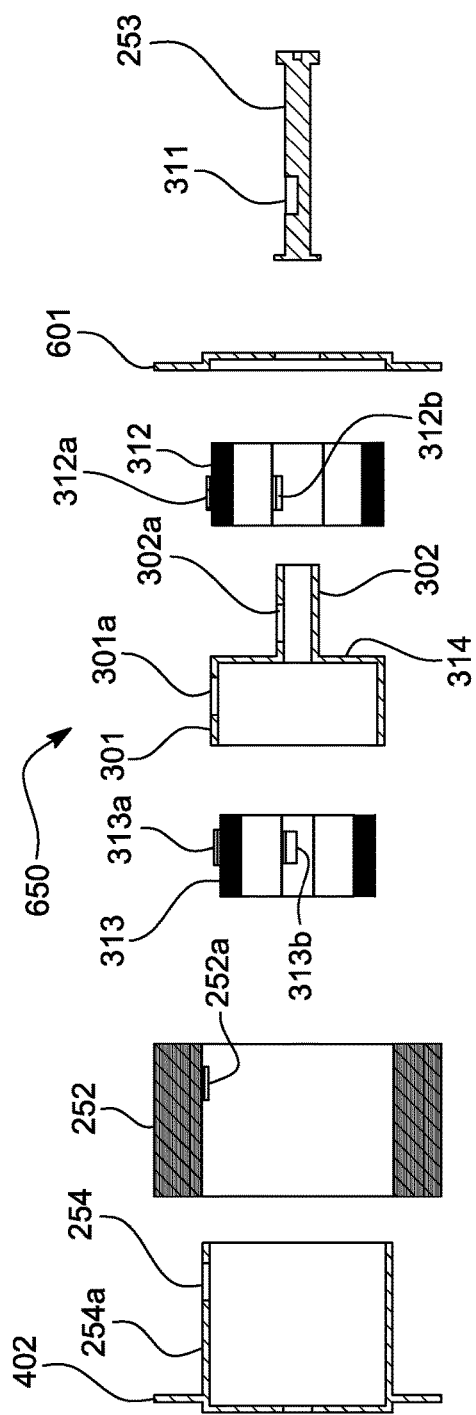
FIG. 6A
FIG. 6B
FIG. 6C SECTION A-A

COMPACT TAPE MEASURE RETRACTION MECHANISM

CROSS-REFERENCE(S) TO RELATED APPLICATION(S)

None.

TECHNICAL FIELD

This application relates generally to measuring devices. More specifically, this application relates to a compact tape measure with a multi-segmented spring-based tape retraction mechanism.

BRIEF DESCRIPTION OF THE DRAWINGS

The drawings, when considered in connection with the following description, are presented for the purpose of facilitating an understanding of the subject matter sought to be protected.

FIG. 3D shows an example cross-section G-G of the compact tape measure from the perspective marked in FIG. 3B;

FIG. 4 shows an example cut-away perspective view of the compact tape measure of FIG. 1 with a portion of tape housing removed;

FIG. 6A shows an example exploded perspective view of a tape spool assembly of the compact tape measure of FIG. 1;

FIG. 6B shows an example side view of the exploded perspective view of the tape spool assembly of FIG. 6A with cross-section A-A marked; and FIG. 6C shows an example cross-section A-A of the exploded perspective view of the tape spool assembly of FIG. 6A.

DETAILED DESCRIPTION

Figure 2A:
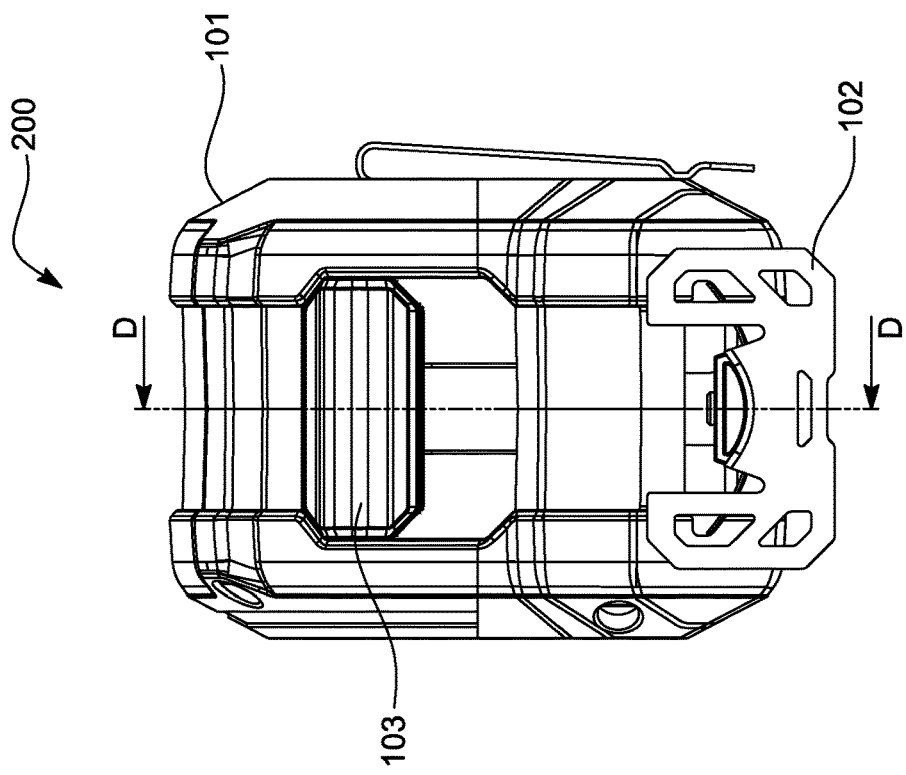
FIG. 2A shows an example frontal view of the compact tape measure of FIG. 1, with cross-section D-D marked.

While the present disclosure is described with reference to several illustrative embodiments and example devices described herein, it should be clear that the present disclosure should not be limited to such embodiments. Therefore, the description of the embodiments provided herein is illustrative of the present disclosure and should not limit the scope of the disclosure as claimed. In addition, while following description references a two-segment spring-loaded tape retraction mechanism, it will be appreciated that the disclosure may be applicable with other types of tape retraction mechanism with more than two segments.

Briefly described, a system and a method are disclosed including a compact tape measure housing enclosing a tape spool with a multi-segment spring-loaded tape retention mechanism including a tape spool, a primary rewind spring, a secondary rewind spring coupled with the primary rewind spring via a rotating spring coupling. In various embodiments, the primary and the secondary springs may be deployed within the tape housing side-by-side making the two rewind spring smaller in diameter than a single rewind spring with the same total length of spring. In some embodiments, the primary rewind spring and the secondary rewind spring are coupled to the tape spool and the housing via an axle pin. The diameter of the tape measure housing may be reduced if two or more spring are used instead of a single one. The tape retention mechanism works by functionally placing the primary and the secondary springs in series. On pulling the measuring tape out of the housing for use, the primary spring is gradually compressed causing the secondary spring to start compressing also. On release of the tape, the springs operate in reverse, retracting the tape.

In various embodiments, a measurement apparatus is disclosed having a housing with cavities to hold internal components, a primary rewind spring deployed within the housing, a secondary rewind spring deployed within the housing, and a rewind spring coupling, having a large end and a small end, coupling the primary rewind spring and the secondary rewind spring to allow the primary rewind spring and the secondary rewind spring to operate in series. The primary rewind spring, the secondary rewind spring, and the rewind spring coupling constitute parts of a spool assembly.

In various embodiments, a compact tape measure is disclosed including a housing with cavities to hold internal components, a tape spool enclosure holding a measurement tape, a primary rewind spring deployed within the housing, a secondary rewind spring deployed within the housing, and a two-stage spring coupling is coupled with the tape spool enclosure, the primary rewind spring and the secondary rewind spring to transmit forces between the tape spool enclosure, the primary rewind spring and the secondary rewind spring.

In various embodiments, a measurement tape retraction apparatus is disclosed including a tape spool enclosure holding a measurement tape, a primary rewind spring, a secondary rewind spring, and a two-stage spring coupling having a small end and a large end. The small end is coupled with the primary rewind spring and the large end is coupled with the secondary rewind spring. The movement of the measurement tape causes a movement of the primary rewind spring, which is transmitted to the secondary rewind spring via the two-stage spring coupling.

Building contractors, construction crews, painters, carpet layers, private do-it-yourself (DIY) people, shipping operations, moving companies, warehouses, and the like that have to measure the dimensions of objects, spaces, boxes and the like, often use measurement devices, such as lasers, flat tapes, spring-loaded reel tapes, land the like. Some tape measures include a blade, with markings showing units of length such as inches or centimeters, wound on a reel and may also include a retraction system for automatically retracting the blade onto the reel after use. With automatic blade retention, the retraction assembly is generally powered a spring, such as a spiral or coil spring. When the tape is pulled out by the user, potential energy is stored in the spring by tensioning it. The potential energy is released by the unwinding of the spring, which is used to rewind the tape back onto its spool or reel. In other types of tape measures, retraction of the tape is performed via manual operation of handle or a crank. The latter manual type of tape measure is often larger in diameter and is used for longer distance measurements.

The spring-loaded tapes are often compact enough to be carried by the user on his tool belt, regular belt, pocket, or small toolbox to be quickly deployed and used for various measurements. However, given this type of usage, even more compact sizes are often desirable. Additionally, a larger tape width (compared with a smaller width) allows the tape blade to stand out a longer distance and allow easier one-handed or one-person operation of the tape measure. As such, any tape housing design that results in a wider housing also allows the use of a wider table blade.

Figure 1:
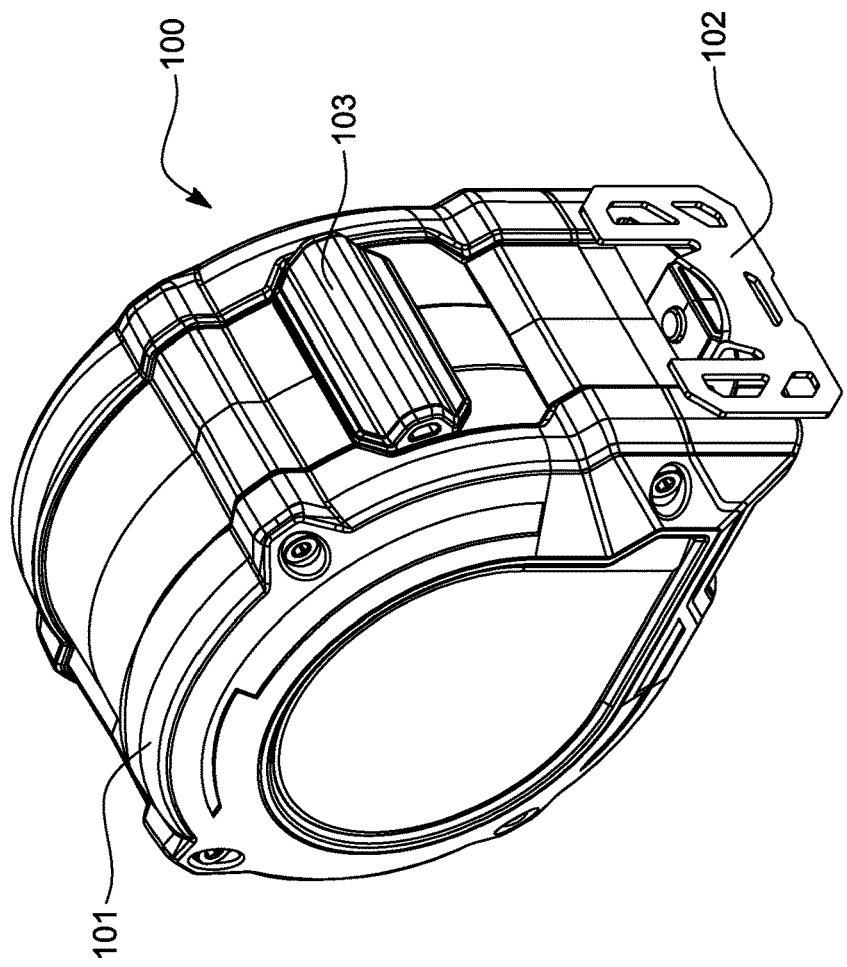
FIG. 1 shows an example perspective view of a compact tape measure.

FIG. 1 shows an example perspective view of a compact tape measure. In various embodiments, a compact tape measure 100 incudes a tape measure housing 101, a tape hook 102, and a tape lock 103.

In various embodiments, the compact tape measure 100 is similar to a larger size (non-compact) tape measures with similar components. The tape measure housing 101 is typically composed of two or more pieces that are screwed or snapped together, for example, by mating plastic tabs and slots. The inside of the of the housing may include reinforcing structures, such as ribs, studs, thickened portions, and the like, to reduce bending and other deformation of the housing when held firmly, dropped onto ground, squeezed in a toolbox, and under other such physically stressed situations. The tape measure housing 101 may further include molded cavities that receive other components, such as screws, pins, spools or reels, motion stops, spinning axle, flexible taps used for coupling sections of housing together, and the like.

In various embodiments, tape hook 102 is generally used to hook and hold one end of the tape at an end of an object to be measured, such as a box, and move the tape measure to draw the tape out with one hand. The tape hook 102 is typically in the form of a right angle (with respect to the surface of the tape) that fits on a right angle edge, like the edge of a table or a box. The tape hook 102 may be used in two distinct ways, one is to hook it on an edge and pull back the tape measure to draw out the tape, while another way is to push the hook against a surface, such as a wall or other surface to measure the distance. However, the thickness of the hook is added to the measured distance when the hook is pushed against a surface, slightly distorting the measurement.

To avoid this distortion, generally, the tape hook 102 is coupled to the tip of the tape slightly loosely such that it can slide back and forth along the longitudinal direction of the tape exactly the same amount as the thickness of the hook. The first distance marking on the tip of the tape is also shorter than the other distance markings on the rest of the tape. Hence, when the hook is pushed against a surface it slides backwards towards the tape and its thickness is added to measurement, but slides forward, away from the tape, when pulled from an edge to subtract its thickness.

In some embodiments, the tape hook 102 may be simple bent edge (90 degree angle), while in other embodiments, it may have side flaps also for better hooking on to a side edge in some situations.

In various embodiments, the tape lock 103 is used to stop the tape from further sliding in or out of the tape measure housing 101. In some embodiments, the stop may engage a wedge that presses against the tape and increases the friction between the tape and the slot from which the tape emerges. Those skilled in the art will appreciate that the tape lock 103 may be deployed around the housing in various positions, such as under the tape or over the tape, and stop movement of the tape by various other methods, such as direct pressure against the tape or prevention of rotation tape spool.

FIG. 2A shows an example frontal view of the compact tape measure of FIG. 1, with cross-section D-D marked. In various embodiments, the frontal view 200 f the compact tape measure 100 (see FIG. 1) includes the tape measure housing 101, the tape hook 102, and the tape lock 103.

Figure 2B:
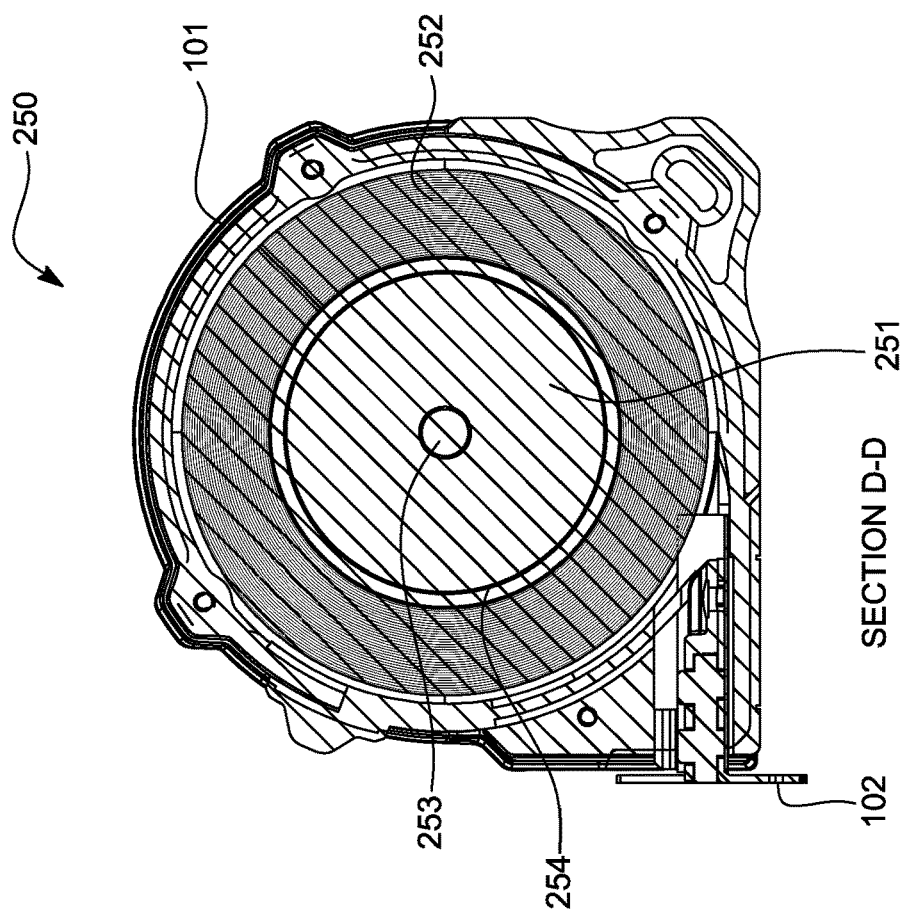
FIG. 2B shows an example cross-section D-D of the compact tape measure from the perspective marked in FIG. 2A.

Cross-section D-D is marked to specify and define the relationship between the view shown in FIG. 2A and FIG. 2B. This cross-section is further described below with respect to FIG. 2B.

FIG. 2B shows an example cross-section D-D of the compact tape measure from the perspective marked in FIG. 2A. In various embodiments, the cross-section D-D 250 includes the tape measure housing 101, the tape hook 102, a spring coupling surface 251, a measuring tape 252 (in wound up state), a tape axle 253, and tape spool 254.

In various embodiments, the spring coupling surface 251 encloses one of the rewind springs, described later herein. The operation of the spring coupling is also described later herein.

In various embodiments, the measuring tape 252 is wound up around a spool rotatably coupled with the tape axle 253. A cavity may be formed that receives a rewind spring as described below with respect to FIGS. 3B, 5B, and 6, among others, using a combination of the spring coupling surface 251 and spring coupling sidewall. As the measuring tape 252 is unwound around the tape axle 253, the spring coupling transfers the motion to the springs, as described below.

Figure 3A:
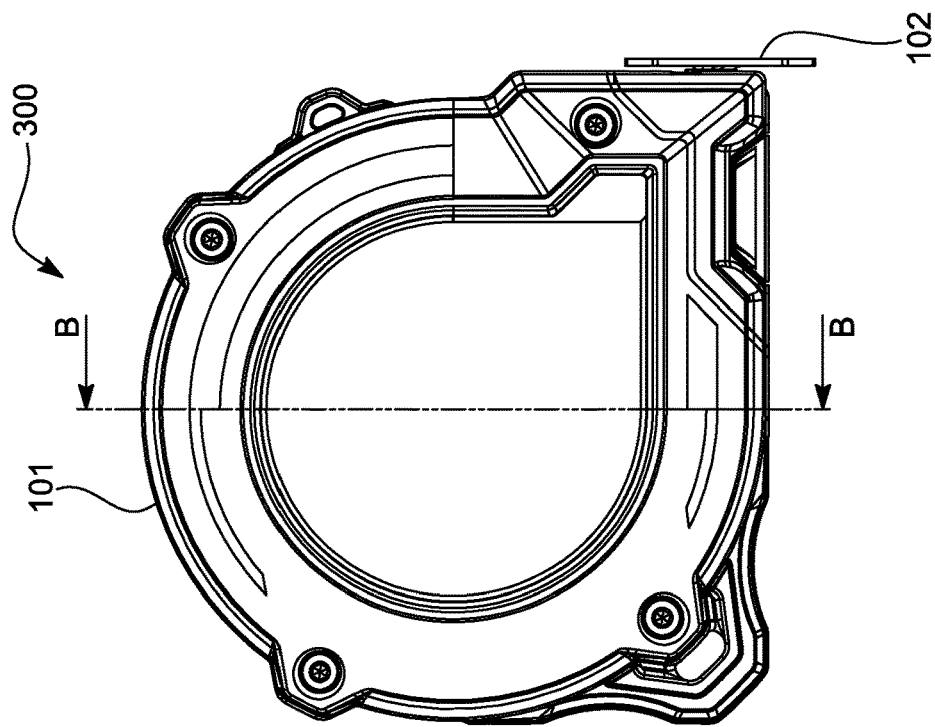
FIG. 3A shows an example side view of the compact tape measure of FIG. 1 with cross-section B-B marked.

FIG. 3A shows an example side view of the compact tape measure of FIG. 1 with cross-section B-B marked. The side view 300 of the compact tape measure may include a tape measure housing 101 and a tape hook 102. A cross-section B-B is marked in the figure to be described later with respect to FIG. 3B.

Figure 3C:
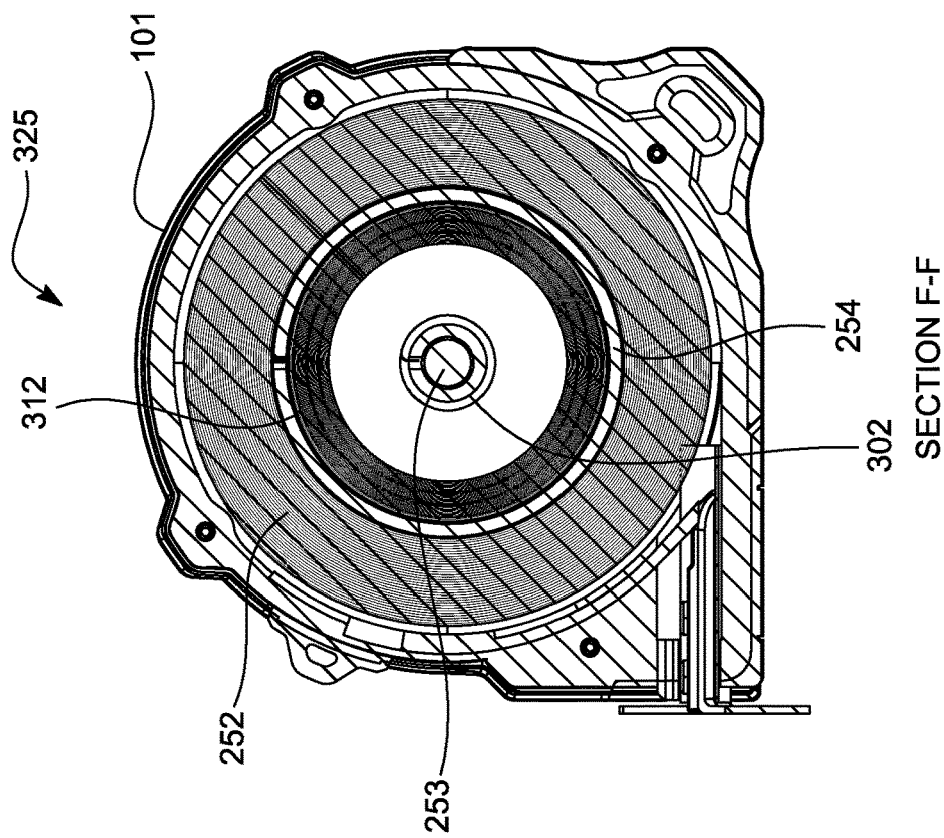
FIG. 3C shows an example cross-section F-F of the compact tape measure from the perspective marked in FIG. 3B.
Figure 3B:
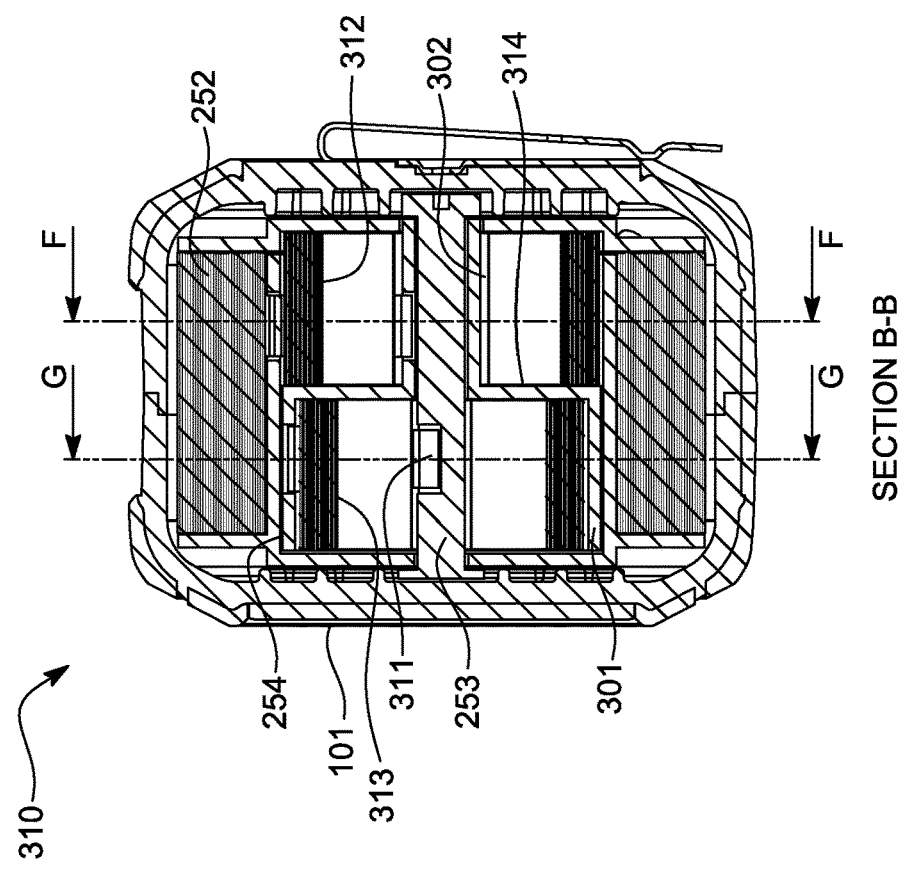
FIG. 3B shows an example cross-section B-B of the compact tape measure from the perspective marked in FIG. 3A, in which an example tape retraction mechanism is visible and cross-sections F-F and G-G are marked.

FIG. 3B shows an example cross-section B-B of the compact tape measure from the perspective marked in FIG. 3A, in which an example tape retraction mechanism is visible and cross-sections F-F and G-G are marked. In various embodiments, cross-section B-B 310 may include tape measure housing 101, the measuring tape 252 wound around the tape axle 253, the tape spool 254, spring coupling large sidewall 301, spring coupling small sidewall 302, axle notch 311, primary rewind spring 312, secondary rewind spring 313, and rewind spring coupling 314.

In various embodiments, a rewind spring coupling 314 may be formed by the spring coupling large sidewall 301 attached to the spring coupling small sidewall 302, creating two distinct sections for the rewind spring coupling 314, a large end and a small end, corresponding to the spring coupling large sidewall 301, and spring coupling small sidewall 302, respectively. The two large and small ends create a two-stage or two-part rewind spring coupling 314, each stage coupled with a different rewind spring. The rewind spring coupling 314 is used to couple the primary rewind spring 312 to the secondary rewind spring 313 in series. Being in series, means one spring is first placed under stress, whether in compression or in tension (depending on the type of the spring used), and compressed or extended towards its maximum or minimum length, respectively, while the second or the next spring is also placed under stress. When springs act in series, their reaction force are not added together, only their total length is increased. This is in contrast to springs used in parallel in which their length does not change but their reaction forces are added together.

The rewind spring coupling 314 also functions like a transmission device or apparatus to transmit spring or tension force from one rewind spring to another.

Hence, two springs deployed in series provide the same force as a single spring stressed to the same extent but provide a greater length to support retraction of a longer measuring tape. In the configurations disclosed herein, splitting one longer spring into two shorter springs coupled in series also reduces the diameter of the compact tape measure. The diameter of the tape measure housing 101 (see FIG. 1) is generally proportional to the diameter of the wound-up measuring tape 252, which itself encloses and is proportional to the diameter of the rewind spring. Thus, splitting the rewind spring into the primary rewind spring 312 and the secondary rewind spring 313 helps reduce the overall diameter of the compact tape measure 100.

In various embodiments, the primary and secondary rewind springs (312 and 313) are placed side-by-side with respect to the tape axle 253, as shown in FIG. 3B. The primary rewind spring 312 is coupled with the small end of the rewind spring coupling 314, while the secondary rewind spring 313 is coupled with the large end of the rewind spring coupling 314. The coupling of the rewind spring coupling 314 to the rewind springs and the tape axle 253 may be done using a notch or a slot in one component and a mating tab or protrusion in the coupled component so, the two components do not move relative to each other. For example, the tape axle notch 311 may receive a corresponding tab from the spool for the secondary rewind spring 313. This is further described below with respect to FIGS. 6A and 6C.

In various embodiments, the primary rewind spring 312 and the secondary rewind spring 313 are coiled, forming a short layered cylinder that have an opening or hole in the middle. The layers of the cylinder are the windings of the spring. The holes in the middle of the coiled springs are used to enclose tape axle 253 as it passes through various components to hold the tape measure together.

In various embodiments, the measuring tape 252 may be made of various types of metals or alloys, plastic, or other synthetic material that are flexible and resilient enough for repeated winding and unwinding over many years and many uses. The measuring tape 252 may further be curved transversely, in a direction perpendicular to the longitudinal direction of the tape that winds around the circumference of the tape spool or reel. Such curvature allows a longer stand-out length for the tape when unwound, so the tape hook may reach an edge that may be a few feet or meters away. This feature allows easier access to inaccessible corners or edges that cannot be reached or are difficult to reach by hand to hook the tape and measure a dimension.

In various embodiments, the primary and secondary rewind springs may be of various types including leaf springs, flat coil springs, torsion springs, extension or compression springs and the like. The type of spring used depends on the length and size of the tape measure device, retraction mechanism, and other considerations. Flat coil springs are some of the more common types used in tape measures.

In operation, when the tape measure housing 101 is held in user's hand and the measuring tape 252 is unwound and pulled out from the housing and extended, the tape spool 254 rotates accordingly and causes the primary rewind spring 312 to also rotate in the same direction around the tape axle 253 due to the force being exerted on it by the pulling of the measuring tape 252. At the same time, the rewind spring coupling 314 also starts rotating around the tape axle 253 because of the force exerted on it by the primary rewind spring 312, which is being stressed and its coil is tightening. The rotation of the rewind spring coupling 314 causes the secondary rewind spring 313, which is enclosed by the large end of the rewind spring coupling 314, to also start rotating while at the same time being stressed and compressed.

When the measuring tape 252 is released, the reverse of the above process takes place. Namely, the secondary rewind spring 313 starts decompressing (releasing stress and energy) and rewinding and pulling the measuring tape 252 back into the tape measure housing 101. At the same time, the primary rewind spring 312 also starts to decompress andwind up the the measuring tape 252.

To further describe the structure of the compact tape measure 100, two other cross-sections, F-F and G-G are considered below with respect to FIGS. 3C and 3D. These cross sections further depict the structure of the rewind spring coupling 314 and the primary and secondary rewind springs 312 and 313, respectively, with respect to the measuring tape 252.

FIG. 3C shows an example cross-section F-F of the compact tape measure from the perspective marked in FIG. 3B. In various embodiments, cross-section F-F 325 includes tape measure housing 101, measuring tape 252, tape axle 253, tape spool 254, spring coupling small sidewall 302, and primary rewind spring 312.

The cross-section F-F 325 shows the primary rewind spring 312 in relation to the tape axle 253, the measuring tape 252 and the small end of the rewind spring coupling 314. From this perspective, the primary rewind spring 312 is shown to be enclosed or surrounded by the measuring tape 312 and its tape spool 254. When the measuring tape 252 is pulled out of the tape measure housing 101 towards the left of the figure, the tape spool 254 rotates clockwise (with respect to the plane of this figure) and causes the primary rewind spring 312 to also turn in clockwise direction to stress and compress the spring around the spring coupling small sidewall 302. When the primary rewind spring 312 is stressed and compressed in this manner, then the force of pull exerted on the measuring tape 252 to pull it out and extend it, will also be transferred to the rewind spring coupling 314, and in turn, to the secondary rewind spring 313.

FIG. 3D shows an example cross-section G-G of the compact tape measure from the perspective marked in FIG. 3B. In various embodiments, the cross-section G-G 350 includes tape measure housing 101, measuring tape 252, tape axle 253, tape spool 254, spring coupling large sidewall 301, and secondary rewind spring 313.

The cross-section G-G 350 shows the secondary rewind spring 313 in relation to the tape axle 253, the measuring tape 252 and the large end of the rewind spring coupling 314. From this perspective, the secondary rewind spring 313 is shown to be enclosed or surrounded by the measuring tape 312 and its tape spool 254, as well as being enclosed by the large end of the rewind spring coupling 314. When the measuring tape 252 is in an extended state and then released, the secondary rewind spring 313 starts unwinding (decompressing) and pulling the measuring tape 252 back into the tape measure housing 101 and winding it counterclockwise onto the tape spool 254. When the secondary rewind spring 313 is is decompressing in this manner, then the force of the compressed primary rewind spring 312 is also used to decompress and pull in the measuring tape 252 into the tape measure housing 101.

FIG. 4 shows an example cut-away perspective view of the compact tape measure of FIG. 1 with a portion of tape housing removed. In various embodiments, the cut-away perspective view 400 includes the remaining part of the tape measure housing 101, the tape hook 102, tape axle 253, spool assembly 401, tape spool 254, and tape spool side plate 402.

In various embodiments, the spool assembly 401 includes all the internal components and spooling mechanisms for the measurement tape 252 and the rewind springs. These mechanisms and components are described in more detail below with respect to FIGS. 6A-6C.

Figure 5B:
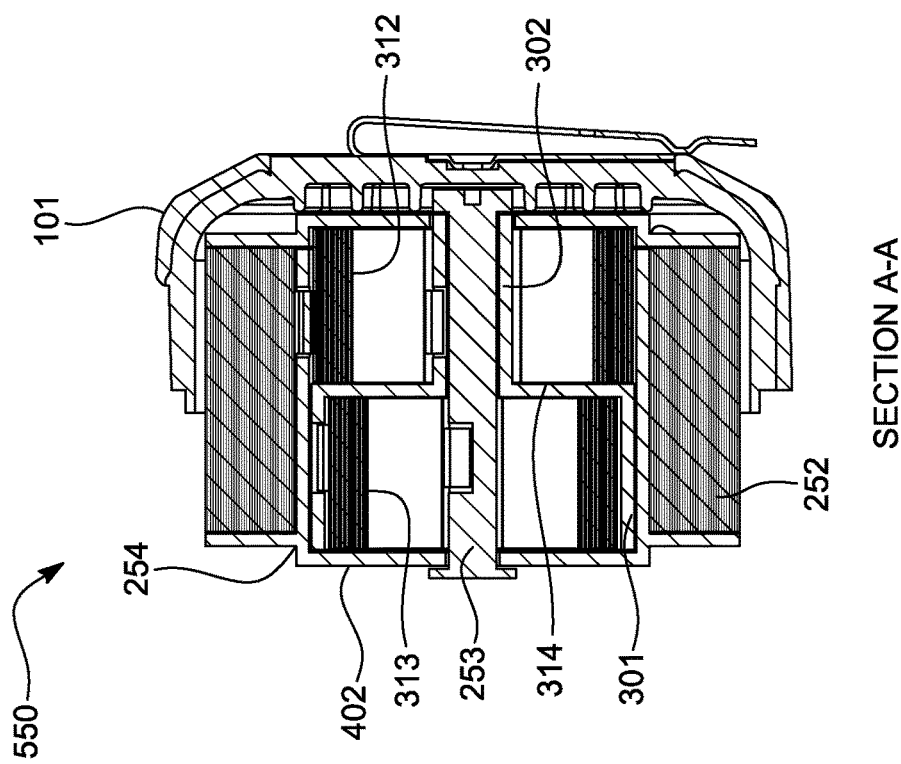
FIG. 5B shows an example cross-section A-A of the compact tape measure from the perspective marked in FIG. 5A.
Figure 5A:
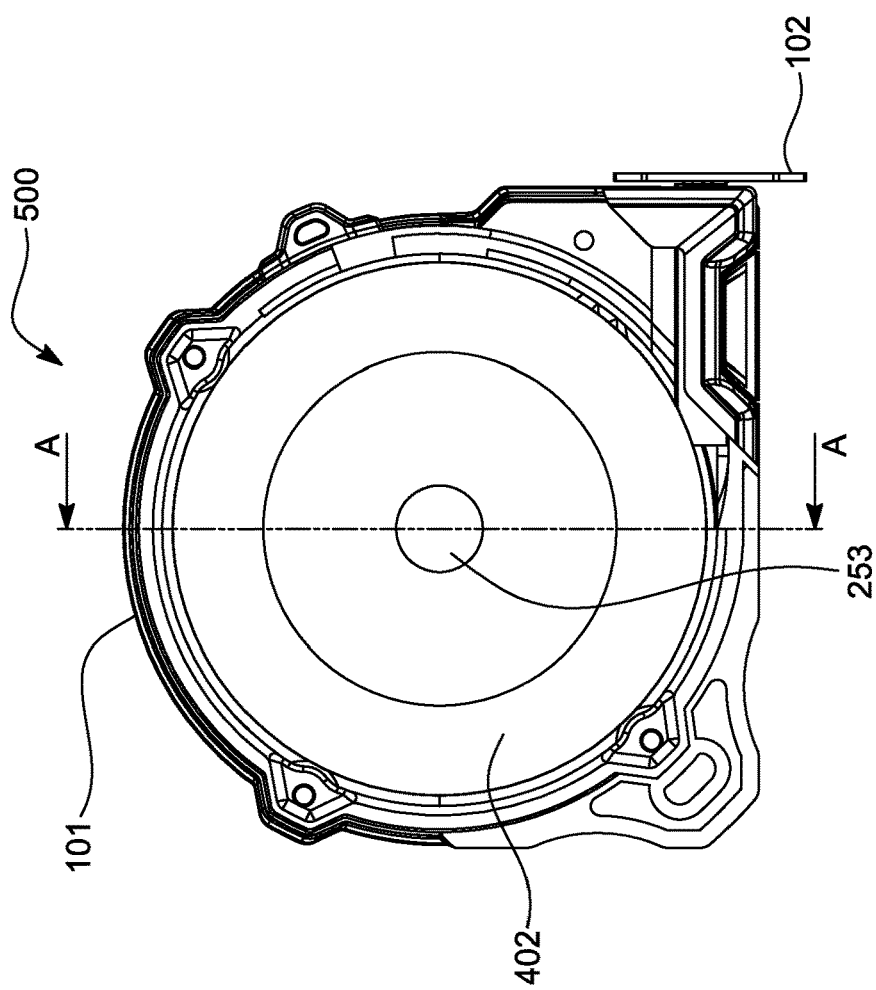
FIG. 5A shows an example side view of the cut-away perspective view of the compact tape measure of FIG. 4, with cross-section A-A marked.

FIG. 5A shows an example side view of the cut-away perspective view of the compact tape measure of FIG. 4, with cross-section A-A marked. In various embodiments, the side view 500 includes the tape measure housing 101, the tape hook 102, the tape axle 253, and the side plate 402 of the tape spool 254.

Cross-section A-A is marked to specify and define the relationship between the view shown in FIGS. 5A and 5B. This cross-section is further described below with respect to FIG. 5B.

FIG. 5B shows an example cross-section A-A of the compact tape measure from the perspective marked in FIG. 5A. In various embodiments, the cross-section A-A 550 includes a part of the tape measure housing 101, measurement tape 252, tape axle 253, tape spool 254, spring coupling large sidewall 301, spring coupling small sidewall 302, primary rewind spring 312, secondary rewind spring 313, rewind spring coupling 314, and tape spool side plate 402.

In various embodiments, the cross-section A-A 550 shows substantially the same components and relationships as shown in FIG. 3B, but with more clarity due to the removal of part of the tape measure housing 101. This cross-section shows the internal structure of the spool assembly 401 (see FIG. 4) including the tape spool 254 supporting the winding of the measurement tape 252 around it. This view further shows the primary rewind spring 312 and the secondary rewind spring 313 that are arranged side-by-side, with respect to the tape axle 253, and coupled together with the rewind spring coupling 314. The large end of the rewind spring coupling 314 encloses the secondary rewind spring 313, while the small end of the rewind spring coupling 314 is inserted into the spool supporting the primary rewind spring 312. The rewind spring coupling 314 allows the primary and secondary rewind springs to operate in series, as described above with respect to FIG. 3B. The primary and secondary rewind springs are coupled with the rewind spring coupling 314 via slots or notches provided in the tape axle 253 and the tape spool, as further discussed below with respect to FIGS. 6A-6C.

FIG. 6A shows an example exploded perspective view of a tape spool assembly of the compact tape measure of FIG. 1. In various embodiments, the exploded perspective view 600 includes tape axle 253, axle notch 311, spool assembly side plate 601, primary rewind spring 312, primary spring outer tab 312a, spring coupling large sidewall 301, spring coupling small sidewall 302, spring coupling large sidewall slot 301a, spring coupling small sidewall slot 302a, secondary rewind spring 313, secondary spring tab 313a, measurement tape 252, tape spool 254, tape spool slot 254a, and tape spool side plate 402.

In various embodiments, the exploded perspective view 600 shows the relationships between the components in the spool assembly 401 and how they are arranged and fit together to create the spool assembly 401. Starting from the right side of this figure, the tape axle 253 passes through an opening or center hole in the spool assembly side plate 601 that serves to contain and keep all other internal components described below within the spool assembly 401. The tape axle 253 passes through all the components shown and the center hole in the tape spool side plate 402, as shown in FIG. 5B. The tape axle 253 functions as a center of rotation for the other spools and components.

the primary rewind spring 312 has two ends that are formed into a tab for engaging a slot in other components, as further described below. The two ends include the outer tab 312a and an inner tab described below with respect to FIG. 6C. primary rewind spring 312 is coupled to the spring coupling small sidewall 302 via attachment of the primary spring outer tap 312a with the spring coupling small sidewall slot 302a. Axle 253 passes through the center of the primary rewind spring 312, as shown in FIGS. 3B and 5B. The inner end of the primary rewind spring 312 engages at least one of the tape spool slot 254a or an inner tab of tape measure 252, shown later in FIG. 6C. Those skilled in the art will appreciate that slots and tabs may be interchangeable, namely, a slot may be used instead of a tab and vice versa. Also, instead of an elongated tab and slot, other mating components may be used with different shapes to couple these components together. For example, a small stud and hole or a keyed tongue and groove configuration may be employed in such arrangements. The same is true about any of the tab and slot arrangements described herein.

With continued reference to FIG. 6A, the spring coupling large sidewall 301 fits inside tape spool 254 and at the same time encloses the secondary rewind spring 313. The secondary spring tab 313a fits into the spring coupling large sidewall slot 301a. The sum of the widths (along the longitudinal axis of tape axle 253 in this figure) of the primary and secondary rewind springs 312 and 313, respectively, is the same size as or slightly bigger than the width of the measurement tape 252 or tape spool 254, each rewind spring occupying approximately half the width of the tape spool 254.

The tape spool 254 is enclosed within or surrounded by the measurement tape 252, and also encloses the spring coupling large sidewall 301. The secondary spring outer tab 313a also fits into the spring coupling large sidewall slot 301a. The tape spool side pate 402 covers the other side of the spool assembly 401 and together with the spool assembly side plate 601 contain and hold all the internal components of the spool assembly 401.

All the tab and slot arrangements engage and couple together various components to allow the rewind spring coupling 314 operate and function properly and engage each rewind spring and corresponding spools at the appropriate point.

FIG. 6B shows an example side view of the exploded perspective view of the tape spool assembly of FIG. 6A with cross-section A-A marked. In various embodiments, side view 625 includes tape spool side plate 402.

Cross-section A-A is marked to specify and define the relationship between the view shown in FIGS. 6B and 6C. This cross-section is further described below with respect to FIG. 6C.

FIG. 6C shows an example cross-section A-A of the side view of the tape spool assembly of FIG. 6A. In various embodiments, the cross-section A-A 650 includes tape axle 253, axle notch 311, spool assembly side plate 601, primary rewind spring 312, primary spring outer tab 312a, primary spring inner tab 312b, rewind spring coupling 314, spring coupling large sidewall 301, spring coupling small sidewall 302, spring coupling large sidewall slot 301a, spring coupling small sidewall slot 302a, measurement tape 252, measurement tape tab 252a, secondary rewind spring 313, secondary spring outer tab 313a, secondary spring inner tab 313b, tape spool 254, tape spool slot 254a, and tape spool side plate 402.

In various embodiments, the cross-section A-A 650 shows the same components as shown in FIG. 6A, with some new details not visible in the perspective view of FIG. 6A. As such, the new features and details are described here without repeating the descriptions already presented with respect to FIG. 6A. More specifically, the relationships between the various tabs and slots are more fully described with respect to this figure.

In various embodiments, when all the components in the spool assembly 401 are assembled, the engagement of various tabs and slots are as follows. The tape axle slot 311 engages the secondary spring inner tab 313b. The primary spring outer tab 312a engages at least one of tape spool slot 254a and measurement tab 252a. The primary spring inner tab 312b may be coupled with spring coupling small sidewall slot 302a. The secondary spring outer tab 313a engages spring coupling large sidewall slot 301a. The measurement tape slot 252a may be coupled with tape spool slot 254a.

In various embodiments, in operation, as the measurement tape 252 is extended and pulled out of the tape measure housing 101, it causes rotation of the primary spring 312 and winding up or compressing the primary rewind spring 312 due to the coupling of the respective tab and slot between these components. The rewind spring coupling 314 also starts rotating because of the coupling of the spring coupling small sidewall slot 302a and the primary spring inner tab 312b. The rotation of the rewind spring coupling 314 also causes the rotation of the secondary rewind spring 313 due to the coupling of the respective tab and slot between these components, thus, compressing the secondary rewind spring 313. In this configuration, the forces generated by the primary rewind spring 312 and the secondary rewind spring 313 act in series. So, the force generated by the springs is not increased, as would be the case if the forces of springs acted in parallel, but rather the length of the tape that may be pulled out is increased compared with using one of these springs. Hence, the same tape length may be accommodated by using two smaller or shorter springs acting in series, as using a single longer spring. Since the two shorter springs have a smaller diameter, they fit in a smaller diameter tape measure housing 101.

At this point, if the measurement tape 252 is released by the user, the secondary and primary rewind springs and rewind spring coupling 314 function in reverse to rewind the measurement tape 252 and retract it into the tape measurement housing 101.

It will be understood that unless explicitly stated or specified, the steps described in a process are not ordered and may not necessarily be performed or occur in the order described or depicted. For example, a step A in a process described prior to a step B in the same process, may actually be performed after step B. In other words, a collection of steps in a process for achieving an end-result may occur in any order unless otherwise stated.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms.

For example, the phrase "A or B" will be understood to include the possibilities of "A" or "B" or "A and B." It is further understood that any phrase of the form "A/B" shall mean any one of "A", "B", "A or B", or "A and B". This construct includes the phrase "and/or" itself.

The above specification, examples, and data provide a complete description of the manufacture and use of the claimed invention. Since many embodiments of the claimed invention can be made without departing from the spirit and scope of the disclosure, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

What is claimed is:

1. A measurement apparatus comprising:
   a housing with cavities to hold internal components;
   a primary rewind spring deployed within the housing;
   a secondary rewind spring deployed within the housing; and
   a rewind spring coupling, distinct from the housing and formed by and having a small end attached to a large end, coupling the primary rewind spring and the secondary rewind spring to allow the primary rewind spring and the secondary rewind spring to operate in series, wherein the primary rewind spring, the secondary rewind spring and the rewind spring coupling constitute parts of a spool assembly.

2. The measurement apparatus of claim 1, further comprising a measurement tape held within a tape spool, which is coupled with the primary spring spool.

3. The measurement apparatus of claim 2, further comprising a tape axle that passes through the primary rewind spring and the secondary rewind spring.

4. The measurement apparatus of claim 3, wherein the tape spool encloses the primary rewind spring and the secondary rewind spring.

5. The measurement apparatus of claim 4, wherein a side plate of a tape spool is used to set a boundary for the primary rewind spring, the secondary rewind spring and the rewind spring coupling on one end of the spool assembly.

6. The measurement apparatus of claim 5, wherein the tape axle passes through a spool assembly side plate on one end of the spool assembly and passes through the tape spool side plate on another end of the spool assembly.

7. The measurement apparatus of claim 6, wherein the small end of the rewind spring coupling is coupled with the primary rewind spring, and the large end of the rewind spring coupling is coupled with the secondary rewind spring.

8. The measurement apparatus of claim 7, wherein a motion of the measurement tape causes a motion of the primary spring spool, which in turn causes a motion of the secondary spring spool.

9. A compact tape measure comprising:
   a housing with cavities to hold internal components;
   a tape spool holding a measurement tape;
   a primary rewind spring deployed within the housing;
   a secondary rewind spring deployed within the housing; and
   a two-stage spring coupling, distinct from the housing and formed by and having a large end attached to a small end, is coupled with the tape spool, the primary rewind spring and the secondary rewind spring to transmit forces between the tape spool, the primary rewind spring and the secondary rewind spring.

10. The compact tape measure of claim 9, further comprising a side plate to contain a spool assembly.

11. The compact tape measure of claim 9, wherein a primary rewind spring tab and a measurement tape tab both engage a tape spool slot.

12. The compact tape measure of claim 9, wherein the two-stage spring coupling includes a small sidewall slot that engages a primary rewind spring inner tab, and a large sidewall slot that engages a secondary rewind spring outer tab.

13. The compact tape measure of claim 9, further comprising a tape axle that passes through the primary rewind spring and the two-stage spring coupling and coupled to the secondary rewind spring.

14. The compact tape measure of claim 13, wherein a tape axle slot engages a secondary rewind spring inner tab.

15. A measurement tape retraction apparatus comprising:
    a tape spool holding a measurement tape;
    a primary rewind spring;
    a secondary rewind spring; and
    a two-stage spring coupling, distinct from the tape spool and formed by and having a small end attached to a large end, wherein the small end is coupled with the primary rewind spring and the large end is coupled with the secondary rewind spring and wherein a movement of the measurement tape causes a movement of the primary rewind spring, which is transmitted to the secondary rewind-spring via the two-stage spring coupling.

16. The measurement tape retraction apparatus of claim 15, wherein the two-stage spring coupling causes the primary rewind spring and the secondary rewind spring to operate in series.

17. The measurement tape retraction apparatus of claim 15, wherein a sum of the width of the primary rewind spring and a width of the secondary rewind spring is equal to or greater than a width of the tape spool.

18. The measurement tape retraction apparatus of claim 15, wherein the tape spool encloses both the primary rewind spring and the secondary rewind spring.

19. The measurement tape retraction apparatus of claim 15, further comprising a spool assembly side plate and a tape spool side plate, wherein the spool assembly comprises the tape spool, the primary rewind spring, the secondary rewind spring, and the two-stage spring coupling.

20. The measurement tape retraction apparatus of claim 19, further comprising a tape axle that passes through the spool assembly side plate and the tape spool side plate.

* * * * *